(12) United States Patent
Messick et al.

(10) Patent No.: US 8,060,643 B2
(45) Date of Patent: Nov. 15, 2011

(54) METHOD AND APPARATUS FOR DYNAMICALLY MANAGING BANDWIDTH FOR CLIENTS IN A STORAGE AREA NETWORK

(75) Inventors: Randall E. Messick, Boise, ID (US);
Richard L. Peterson, Boise, ID (US);
Martin L. Ackerman, Boise, ID (US);
Michael E. Lutz, Boise, ID (US);
Douglas T. Hayden, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2451 days.

(21) Appl. No.: 10/233,234

(22) Filed: Aug. 30, 2002

(65) Prior Publication Data

US 2004/0044770 A1    Mar. 4, 2004

(51) Int. Cl.
*G06F 15/16* (2006.01)
(52) U.S. Cl. ........................................ 709/233; 709/232
(58) Field of Classification Search .......... 709/208–225, 709/226, 235; 713/201; 370/468; 707/204
See application file for complete search history.

(56) References Cited

U.S. PATENT DOCUMENTS

| | | | | |
|---|---|---|---|---|
| 5,778,165 A * | 7/1998 | Saxon | ............................ | 714/4.12 |
| 5,953,338 A * | 9/1999 | Ma et al. | .................... | 370/395.21 |
| 6,003,062 A * | 12/1999 | Greenberg et al. | ............ | 718/104 |
| 6,324,184 B1 * | 11/2001 | Hou et al. | ....................... | 370/468 |
| 6,343,324 B1 | 1/2002 | Hubis et al. | | |
| 6,421,723 B1 | 7/2002 | Tawil | | |
| 6,466,967 B2 * | 10/2002 | Landsman et al. | ............ | 709/203 |
| 6,529,996 B1 * | 3/2003 | Nguyen et al. | ................. | 711/114 |
| 6,564,336 B1 * | 5/2003 | Majkowski | ..................... | 714/4.1 |
| 6,571,354 B1 * | 5/2003 | Parks et al. | ......................... | 714/7 |
| 6,631,477 B1 * | 10/2003 | LeCrone et al. | .............. | 714/5.11 |
| 6,671,724 B1 * | 12/2003 | Pandya et al. | .................... | 709/226 |
| 6,704,885 B1 * | 3/2004 | Salas-Meza et al. | ........... | 714/6.3 |
| 6,847,984 B1 * | 1/2005 | Midgley et al. | ......................... | 1/1 |
| 6,886,035 B2 * | 4/2005 | Wolff | ............................. | 709/219 |
| 6,967,927 B1 * | 11/2005 | Dugeon et al. | .................. | 370/236.1 |
| 7,072,295 B1 * | 7/2006 | Benson et al. | ................. | 370/230 |
| 7,079,534 B1 * | 7/2006 | Medhat et al. | ................. | 370/389 |
| 7,130,890 B1 * | 10/2006 | Kumar et al. | ................... | 709/218 |
| 7,586,944 B2 * | 9/2009 | Messick et al. | ................ | 370/468 |
| 2001/0003830 A1 * | 6/2001 | Nielsen | ........................ | 709/226 |
| 2002/0049841 A1 * | 4/2002 | Johnson et al. | ................ | 709/225 |
| 2002/0069369 A1 * | 6/2002 | Tremain | ........................ | 713/201 |
| 2002/0091722 A1 | 7/2002 | Gupta et al. | | |
| 2002/0103772 A1 * | 8/2002 | Chattopadhyay | .............. | 705/412 |
| 2002/0108059 A1 | 8/2002 | Canion et al. | | |
| 2002/0129143 A1 * | 9/2002 | McKinnon et al. | ............ | 709/225 |
| 2002/0133589 A1 * | 9/2002 | Gubbi et al. | .................... | 709/225 |
| 2002/0174139 A1 * | 11/2002 | Midgley et al. | ................. | 707/204 |
| 2003/0069972 A1 * | 4/2003 | Yoshimura et al. | ............ | 709/226 |
| 2003/0074378 A1 * | 4/2003 | Midgley et al. | ................. | 707/204 |
| 2003/0076849 A1 * | 4/2003 | Morgan et al. | ................. | 370/412 |
| 2003/0100307 A1 * | 5/2003 | Wolochow et al. | ............ | 455/440 |
| 2003/0125034 A1 * | 7/2003 | Weerakoon et al. | ........... | 455/450 |
| 2004/0015602 A1 * | 1/2004 | Goldhammer et al. | ........ | 709/235 |
| 2004/0042489 A1 * | 3/2004 | Messick et al. | ................ | 370/468 |
| 2004/0044770 A1 * | 3/2004 | Messick et al. | ................ | 709/226 |
| 2004/0220980 A1 * | 11/2004 | Forster | ........................... | 707/204 |
| 2005/0259682 A1 * | 11/2005 | Yosef et al. | ..................... | 370/468 |
| 2006/0120282 A1 * | 6/2006 | Carlson et al. | .................. | 370/229 |
| 2006/0190598 A1 * | 8/2006 | Cabrera et al. | .................. | 709/224 |

* cited by examiner

*Primary Examiner* — David England

(57) ABSTRACT

A method for managing bandwidth allocation in a storage area network includes receiving a plurality of Input/Output (I/O) requests from a plurality of client devices, determining a priority of each of the client devices relative to other client devices, and dynamically allocating bandwidth resources to each client device based on the priority assigned to that client device.

19 Claims, 5 Drawing Sheets

METHOD AND APPARATUS FOR DYNAMICALLY MANAGING BANDWIDTH FOR CLIENTS IN A STORAGE AREA NETWORK

BACKGROUND

The use of computers and computer networks pervade virtually every business and other enterprise in the modern world. With computers, users generate vast quantities of data that can be stored for a variety of purposes. This storehouse of data can grow at a phenomenal pace and become critically valuable to those who have generated it. Consequently, there is an ever-present need for data storage systems that improve on capacity, speed, reliability, etc.

In a single computer, the primary data storage device is usually a hard drive with a storage capacity measured in gigabytes. Additionally, computers may store data using such devices as CD-ROM drives, floppy disk drives, tape drive, etc. Within a computer network, the computers of the network may also store data on network servers or other data storage devices, such as those mentioned above, that are accessible through the network. For larger systems with even greater data storage needs, arrays of data storage disks may be added to the network.

Storage Area Networks (SANs) are an emerging technology being implemented to accommodate high-capacity data storage devices, particularly disk arrays, within a network. A SAN is essentially a high-speed network between client devices, such as servers and data storage devices, particularly disk arrays. A SAN overcomes the limitations and inflexibility of traditional attached data storage.

A SAN can overcome limitations of traditional attached data storage but also introduces new considerations. In particular, SANs experience competition for resources when more than one server is attempting to access the same data storage device. A typical storage device has a limited amount of bandwidth in its Input/Output (I/O) paths, and this bandwidth must be shared by the clients accessing the storage device.

SUMMARY

A method for managing bandwidth allocation in a storage area network includes receiving a plurality of Input/Output (I/O) requests from a plurality of client devices, determining a priority of each of the client devices relative to other client devices, and dynamically allocating bandwidth resources to each client device based on the priority assigned to that client device.

BRIEF DESCRIPTION OF THE DRAWINGS

The accompanying drawings illustrate various embodiments of the principles described herein and do not limit the scope of the invention.

Throughout the drawings, identical reference numbers designate similar, but not necessarily identical, elements.

DETAILED DESCRIPTION

A method for managing bandwidth associated with a Storage Area Network (SAN) is described by the present specification. According to one exemplary embodiment, described more fully below, an innovative method limits the bandwidth associated with one I/O path so that a different I/O path may consume the extra bandwidth. In the following description, for purposes of explanation, numerous specific details are set forth in order to provide a thorough understanding of the invention. It will be apparent, however, to one skilled in the art that the invention can be practiced without these specific details.

Reference in the specification to "one embodiment" or "an embodiment" means that a particular feature, structure, or characteristic described in connection with the embodiment is included in at least one embodiment of the invention. The several appearances of the phrase "in one embodiment" in various places in the specification are not necessarily all referring to the same embodiment.

Example Overall Structure

Figure 1:
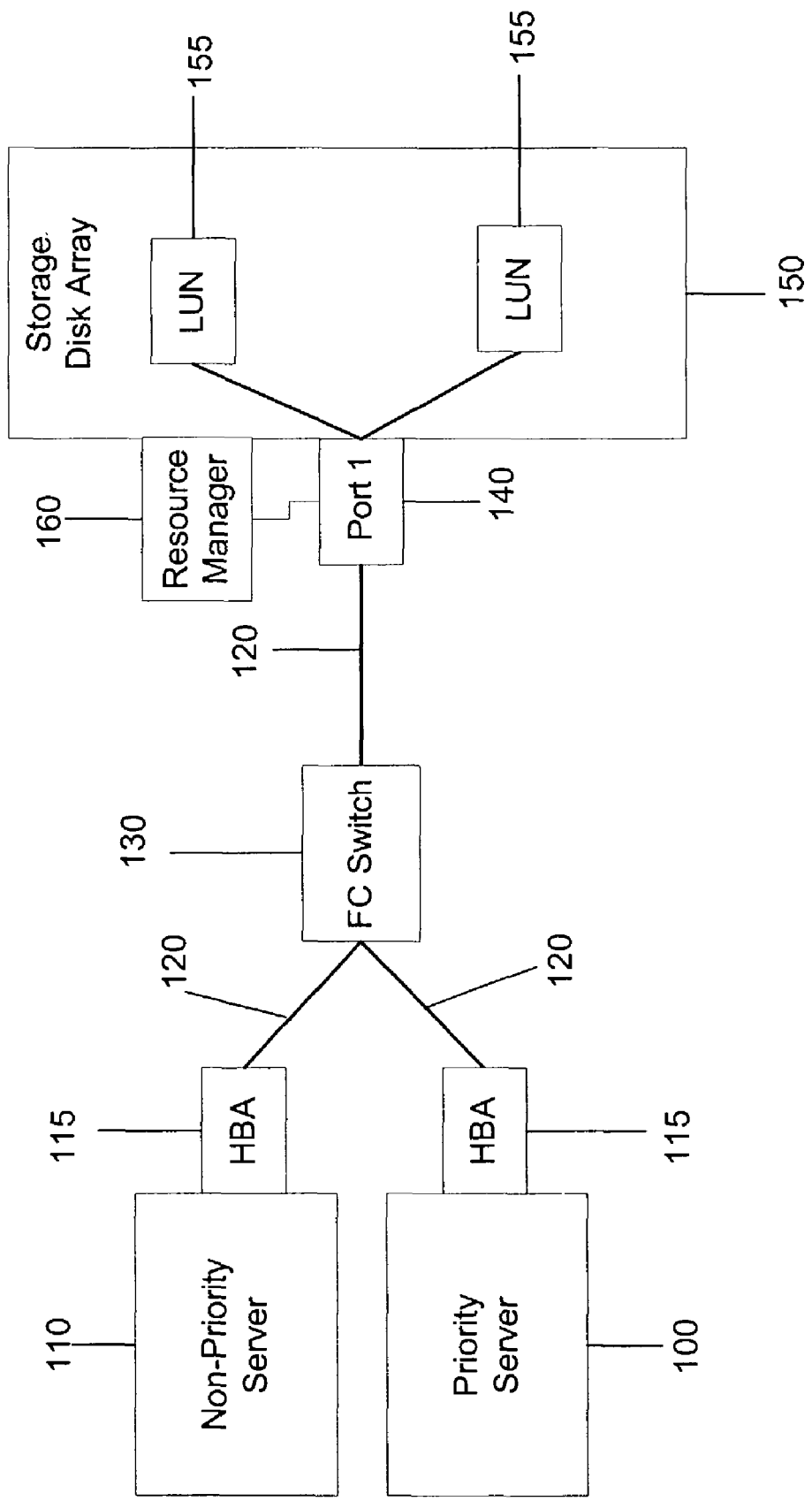
FIG. 1 is a block diagram illustrating an embodiment of a system according to principles described herein.

Storage area networks vary in size and complexity, and are flexible in their configurations for meeting the storage needs of a network. A simplified storage area network configuration is depicted in FIG. 1 to illustrate the transfer of data between a limited number of devices interfaced with a storage area network. More complex storage area networks may interface with any number of devices as needed to meet a given user's storage needs.

FIG. 1 illustrates a data retrieval system according to one embodiment described herein. As shown in FIG. 1, an embodiment of a data retrieval system includes a number of servers or host computers (100, 110), referred to collectively as "clients." As demonstrated in FIG. 1, data retrieval systems may assign a different priority to each client within the data retrieval system, as illustrated by the priority server (100) and the non-priority server (110). Each server is communicatively coupled to a Host Bus Adapter (HBA) (115) which is in turn coupled to a communication line (120).

The communication line (120) that couples the servers (100, 110) to the storage disk array (150) is preferably a fibre channel loop compliant with the "Fibre Channel Physical and Signaling Interface" ((FC-PH) Rev. 4.3, X3T11, Jun. 1, 1994 standard, American National Standards for Information Systems), which standard is hereby incorporated by reference. Each, device on the loop (120), by virtue of the fiber channel host bus adapter, has a unique identifier referred to as its world wide name (WWN). The present invention may also use any unique identifier associated with the servers (100, 110) so long as that identifying means is unique for each device among the interconnected devices.

Continuing in the direction of the communication line (120), the line (120) is fed into a fibre channel switch (130). The switch (130) continues on to a port (140) of the storage disk array (150).

In computing systems, storage disk arrays (150) divide the storage into a number of logical volumes. These volumes are accessed through a logical unit number (LUN) (155) addressing scheme as is common in SCSI protocol based storage systems, including SCSI protocol based, fibre channel loop, physical layer configurations. The term LUN refers to a logical unit or logical volume, or, in the context of a SCSI protocol based device or system, to an SCSI logical unit or SCSI logical volume.

Those of ordinary skill in the art will appreciate that the number of physical disk drives may be the same as, or different from, the number of logical drives or logical volumes. However, for the sake of simplicity and clarity, we use these terms interchangeably here, focusing primarily on logical volumes as compared to the physical disk drives that make up those logical volumes.

The storage disk array (150) also contains a resource manager (160). The resource manager (160) contains firmware that enables the resource manager (160) to identify each server (100, 110) accessing the storage array (150) and to allot I/O bandwidth at the port (140) to each such server (100, 110) as specified by the firmware.

Figure 2:
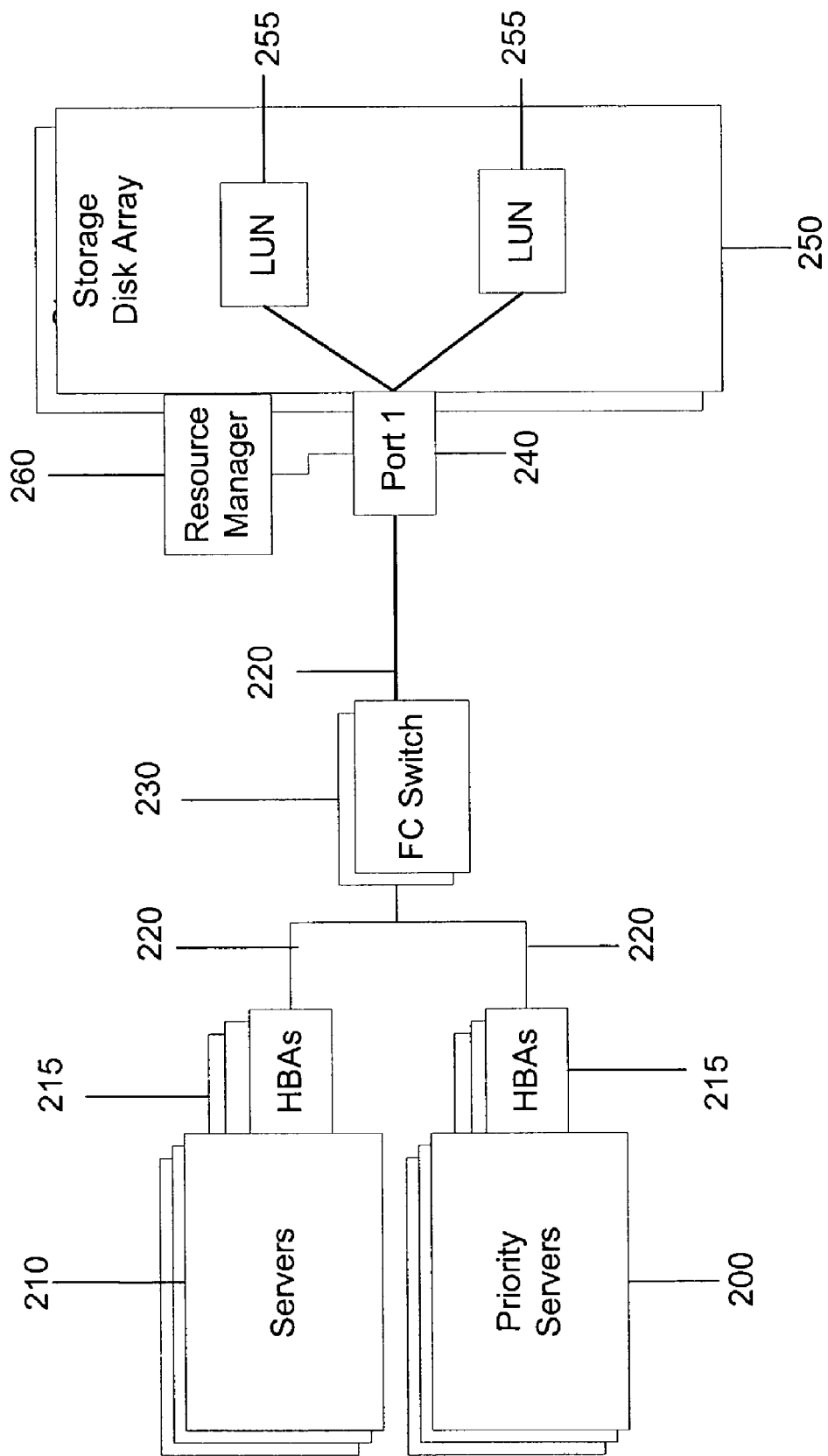
FIG. 2 is a block diagram illustrating an additional embodiment of a system according to principles described herein.

FIG. 2 illustrates an additional configuration of one embodiment described herein. As shown in FIG. 2, a number of servers (200, 210) may be connected via a fibre channel loop (220) to a plurality of FC switches (230) leading to a plurality of storage disk arrays (250) that are communicatively coupled to the network through the switches (230). It will be appreciated by those of ordinary skill in the art that the present invention may be practiced with a number of configurations without varying from the teachings described herein.

Exemplary Implementation and Operation

As mentioned earlier, SANs experience competition for resources when more than one client is attempting to access the same data storage device. A typical storage device has a limited amount of bandwidth in its I/O paths and this bandwidth should be properly apportioned out to the clients accessing the storage device. An I/O path is the path from the client's Host Bus Adapter (HBA), over a Storage Network, to a block of storage on a storage device (e.g. a disk array) (250). In order to properly allocate the bandwidth, the system recognizes that the host systems are not all of the same priority, i.e., in order to optimize the operation of the overall system, some clients or servers need more I/O performance and bandwidth from the storage devices (250) than do other clients. In order to maximize the performance of the system, the maximum storage device performance available for lower priority client systems shouldn't impact the storage device performance available to higher priority clients.

The resource manager (260) is a product that monitors the I/O performance and bandwidth usage of the storage system, and sets performance caps based on user-established policies. One aspect described herein concerns the ability to set an upper limit or cap and a minimum threshold on bandwidth usage. The cap limits the amount of bandwidth a client may use at any one time. The minimum threshold establishes a minimum level of performance below which the user-defined policies, i.e., the caps, are relaxed. There are a number of ways to administer caps and thresholds, including, but not limited to, assigning a cap and/or threshold to each port, to each client/array port pair, or to each client/array LUN pair.

Figure 3:
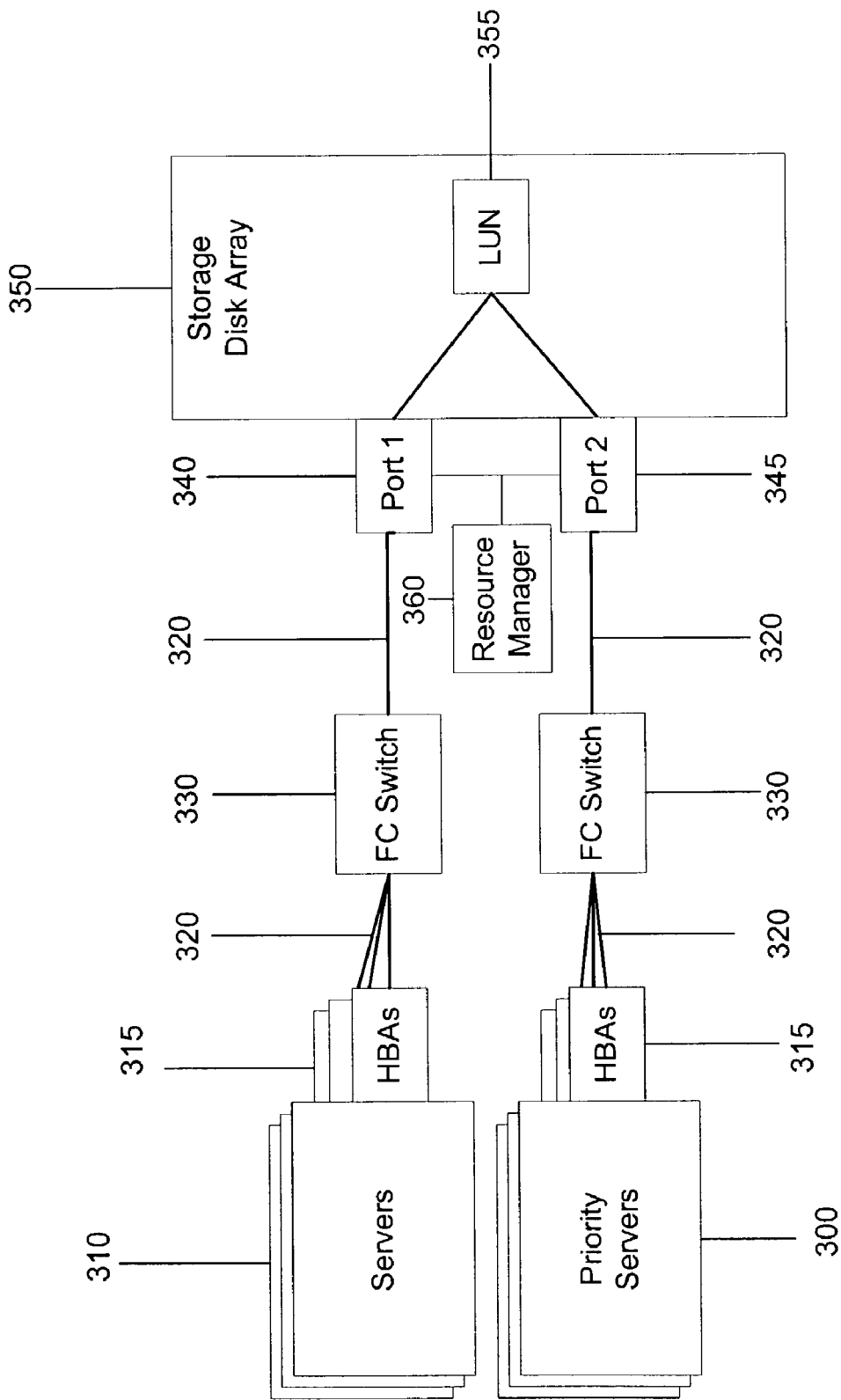
FIG. 3 is a block diagram illustrating an additional embodiment of a system according to principles described herein.

FIG. 3 illustrates an embodiment described herein that bases the threshold and cap on a port. When multiple I/O paths cross the same piece of hardware (e.g. an array port), contention may occur. The path between each client and the storage disk array (350) is considered a separate I/O path here. By allowing one I/O path (non-priority) to be throttled or capped above a certain performance level, the other I/O path (priority) can be allowed to use the extra I/O on the Port. Thus, utilization of the I/O path is optimized. This concept can be expanded out to a very large Storage Network, but can get difficult to manage. By grouping servers into priority categories (Groups), a single setting can be made to all servers in a category automatically.

In FIG. 3, the servers (300, 310) have been grouped into priority groups: priority servers (300) and ordinary servers (310). Each group has a number of HBAs (315) connecting the respective groups to the fibre channel loop (320) leading to a switch (330). Each switch (330) leads to a port (340, 345) for each server group. Port 1 (340) is dedicated to the group of ordinary servers (310) and port 2 (345) is dedicated to the priority servers (300).

By providing independent ports to each respective group of clients, the resource manager (360) can allocate bandwidth resources to each port in proportion to the importance of the corresponding client group. By assigning a cap and a threshold quantity to each port, the bandwidth can be efficiently distributed. By way of example only, if logic unit (355) of the storage disk array (350) can only handle 7,000 input and output operations per second (IOPS), port 1(340) may be capped at 2,000 IOPS. By setting the cap at 2,000 IOPS for port 1 (340), all the servers attached to port 2 (345) can access the remaining 5,000 IOPS associated with the logic unit (355). Accordingly, port 2 may be capped at 5,000 IOPS. By assigning a threshold equal to the aforementioned cap at port 1 (340) and port 2 (345), the bandwidth resources can be dynamically managed. If, by way of example only, port 1 (340) had a threshold of 2,000 IOPS and activity at port 1 (340) drops below that threshold, the cap assigned to port 2 (345) is subsequently released allowing the servers (300) associated with port 2 (345) to make use of the unused bandwidth.

The embodiment demonstrated in FIG. 3 may also be implemented using a single high priority server and a single regular priority server. In this embodiment, a single port (340, 345) is associated with each server. A cap may be implemented on one or both servers through the corresponding port (340, 345) with the residual bandwidth available to the server associated with the other port. Just as indicated above, a threshold may be implemented on either or both of the ports (340, 345). If the activity at one of the ports (340, 345) drops below the threshold assigned it, the assigned cap at the other port is subsequently released to allow the second server make to use of the unused bandwidth.

Figure 4:
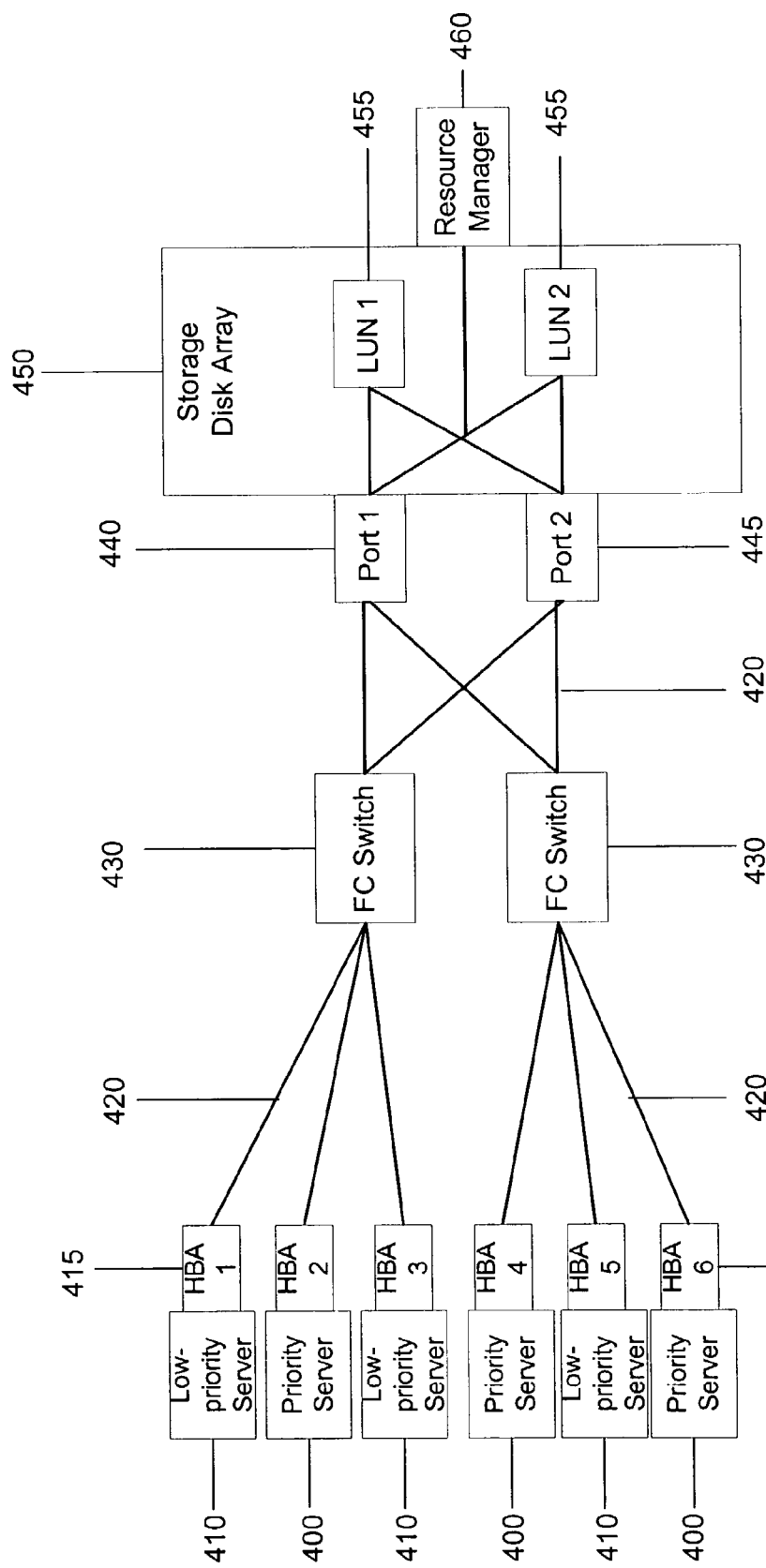
FIG. 4 is a block diagram of a system according to one embodiment described herein.

FIG. 4 illustrates how a cap and threshold may be based upon a client/array port pair. As shown in FIG. 4, clients with different priorities (400, 410) may be commonly linked to the various ports (440, 445) of the storage disk array (450) rather than grouped as in FIG. 3. By virtue of the unique identifier WWN associated with each client, the resource manager (460) can identify which clients (400, 410) are high priority clients (400) and which ones are not (410). By recognizing which HBA (415) is associated with which client (400, 410), the resource manager (460) can place caps and/or thresholds at each port for specific clients.

By way of example only, FIG. 4 illustrates the client/array port pair embodiment described herein. If port 1 (440) is "capped" at 5000 IOPS for HBAs 1, 3, and 5 only (415), and Port 1 (440) has threshold of 2,000 IOPS then if total activity on Port 1 (440) drops below 2,000 IOPs, the caps for HBAs 1, 3, and 5 (415) are released. If Port 2 (445) is "capped" at 5000 IOPS for HBAs 1, 3, and 5 (415) only and Port 2 (445) has threshold of 3,000 IOPS, then if total activity on Port 2 (445) drops below 3,000 IOPs, the caps for HBAs 1, 3, and 5 (415) are released.

Similar to the client/array port pair embodiment explained above, the client/array LUN pair embodiment described herein uses the resource manager (460) to identify the client (400, 410) requesting bandwidth performance and applying corresponding caps and thresholds to the individual logic unit (455) in the storage disk array (450) rather than the ports (440, 445). The dynamic management of the bandwidth resources is still triggered by a drop in activity below the threshold.

However, in this embodiment, the activity is measured at the individual logic unit (455).

This allows for a fine level of user control over the threshold settings. By setting a threshold, the array can relax performance caps when they are not needed and, thereby, not unduly restrict the bandwidth available to the capped port, client/array port pairs, or host/LUN pairs. When all of the bandwidth resources are being used, they are distributed according to priority designations. If, however, activity drops below threshold values, caps for each group may be released to allow for a dynamic redistribution of the available resources. The settings can be made in either I/O per second or MB per second.

Often computer systems have periodic spurts of activity or schedules on which they operate. Events such as nightly backups or daytime merchant hours affect the quantity of I/O traffic and the required quality of service. In order to maximize the efficiency of bandwidth resources, the systems described herein allow the caps and thresholds to be time dependant corresponding to predicted spurts of activities.

Figure 5:
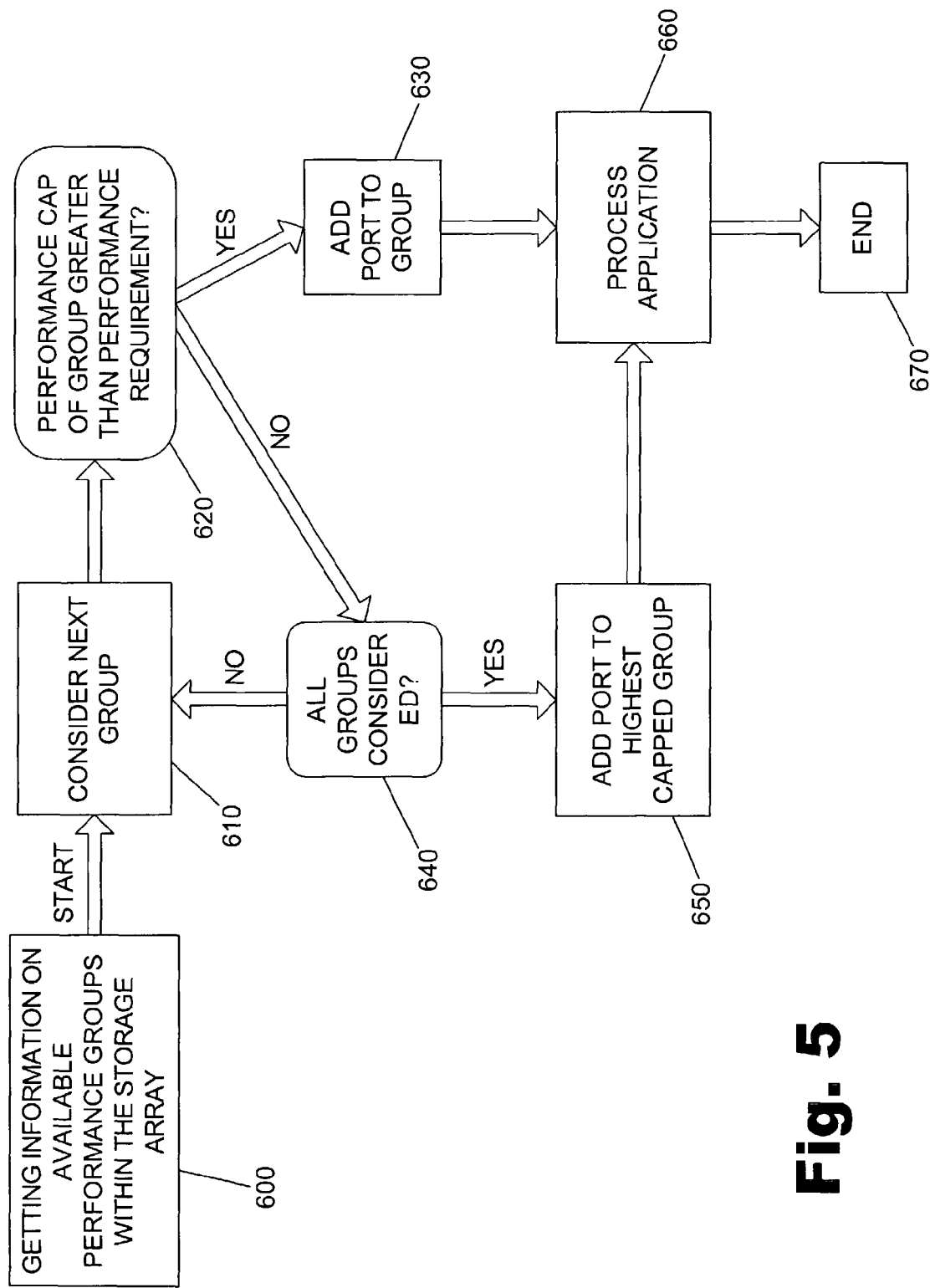
FIG. 5 is a flow diagram for assigning array performance groups according to principles of one embodiment described herein.

In an additional embodiment is demonstrated in FIG. 5. As shown in FIG. 5, the priority of a client may be determined by its application performance requirements. Using the command line interface or script API of a storage management software application, a user application can interrogate various storage arrays and add its connectivity port to an array performance group which meets the application's transaction bandwidth.

As demonstrated in FIG. 5, this embodiment allows for the dynamic grouping of host applications by acquiring information on available performance groups within the storage array.

Initially, the user application evaluates an established group (610). The user application first determines if the performance cap of the first established group is greater than or equal to the application's bandwidth requirement (620). If it is, there is sufficient room in the established group to include the desired application. In that case, the port associated with the application is added to the first established group (630). If, however, the performance cap of the first established group is less than the application bandwidth requirement, the user application determines if there are additional groups (640).

If there are additional groups, the application again evaluates the cap (620) to see if there is sufficient bandwidth to perform the desired application. If all of the groups have been considered and none meet the application bandwidth requirements, the application is added to the group with the highest cap (650).

The embodiment disclosed above allows for dynamic grouping of server priorities. In this manner the groups may be arranged so as to utilize the maximum bandwidth available.

Using the command line interface, script API or Web-based Graphical User Interface (GUT) of a storage management software application, a user application can also dynamically add connectivity bandwidth and increase the performance capability of a host application by controlling multiple connectivity paths between the host computer and the storage array.

When a host application indicates a desire for increased performance capability, the resource manager can then increase available bandwidth accordingly by dedicating additional ports to the host application. This embodiment described herein can then be tied into billing applications for demand-based performance such as pay for performance applications.

The preceding description is not intended to be exhaustive or to limit the invention to any precise form disclosed. Many modifications and variations are possible in light of the above teaching.

The foregoing embodiments were chosen and described in order to illustrate principles of the invention and its practical applications. The preceding description is intended to enable others skilled in the art to best utilize the invention in various embodiments and with various modifications as are suited to the particular use contemplated. It is intended that the scope of the invention be defined by the following claims.

What is claimed is:

1. A method for managing bandwidth allocation in a storage area network comprising:
   assigning different priorities to different ports of a storage device;
   determining a priority of each of plural client devices relative to other client devices;
   assigning one of the different ports to each of said client devices in order to allocate bandwidth resources to each of said client devices;
   setting an upper limit on an amount of bandwidth allocated at a port for a priority of said client devices;
   setting a lower threshold at the port for said priority of client devices;
   receiving a plurality of Input/Output (I/O) requests from the client devices;
   releasing the upper limit when spurts of I/O activity at the port drop below the lower threshold, wherein the upper limit is released so said priority of client devices have access to unused bandwidth; and
   connecting only clients of a same priority to the port of said storage device.

2. The method of claim 1, wherein the upper limit is a cap that limits an amount of bandwidth a client device can use at any one time, and the lower threshold establishes a minimum level of performance below which the cap is relaxed.

3. The method of claim 1, further comprising assigning upper limits and lower thresholds at each of the different ports of the storage device.

4. The method of claim 1, wherein said upper limit and said lower threshold are applied at a logical unit of a storage device of said storage area network.

5. The method of claim 1, wherein, if I/O requests for one or more client devices drop below the lower threshold, the upper limit at the port is released.

6. The method of claim 1, wherein determining a priority for each of said client devices comprises receiving an indication from a user of said priority for each of said client devices.

7. The method of claim 6, wherein said priority levels each require a different fee corresponding to said bandwidth allocation.

8. The method of claim 1, wherein determining said priority for each of said client devices further comprises:
   obtaining information on available array groups within a storage array;
   determining if a performance cap on an array group within said storage array prevents the addition of one of said I/O requests; and
   if said performance cap does not prevent addition of one of said I/O requests, adding I/O requests from that client to said array group.

9. The method of claim 1, wherein determining priority of each of said client devices comprises grouping said client devices into groups according to I/O performance requirements for said client devices.

10. The method of claim 9, wherein each client device in one of said groups receives a same bandwidth allocation setting as other client devices in that group.

11. A system for managing bandwidth allocation in a storage area network comprising:
  means for receiving a plurality of Input/Output (I/O) requests from a plurality of client devices, wherein said I/O requests include data to be written to and read from said storage area network;
  means for assigning different priorities to different ports of a storage device;
  means for assigning each of said client devices to one of the different ports in order to provide a priority of each of said client devices relative to other client devices;
  means for dynamically allocating bandwidth resources for said (I/O) requests to each said client device based on the priority assigned to the different ports;
  means for setting an upper limit on an amount of bandwidth allocated at a port for to a priority of said client devices;
  means for setting a lower threshold at the port for said priority of client devices, wherein the upper limit is released when spurts of I/O activity drop below the lower threshold, wherein the upper limit is released so said priority of client devices have access to unused bandwidth; and
  means for connecting only clients of a same priority to the port of said storage device.

12. The system of claim 11, wherein the lower threshold establishes a minimum level of performance below which bandwidth restrictions for the port are relaxed.

13. The system of claim 11, further comprising means for assigning upper limits and lower thresholds at each of the different ports of the storage device.

14. The system of claim 11, further comprising means for applying said upper limit and said lower threshold at a logical unit of a storage device of said storage area network.

15. The system of claim 11, wherein the upper limit is a cap that limits an amount of bandwidth a client device can use at any one time, and the lower threshold establishes a minimum level of performance below which the cap is relaxed.

16. The system of claim 11, wherein said means for determining a priority for each of said client devices comprise user interface means for receiving an indication from a user of said priority for each of said client devices.

17. The system of claim 11, wherein said means for determining said priority for each of said client devices further comprises:
  means for obtaining information on available array groups within a storage array;
  means for determining if a performance cap on an array group within said storage array prevents the addition of one of said I/O requests; and
  if said performance cap does not prevent addition of one of said I/O requests, means for adding I/O requests from that client to said array group.

18. The system of claim 11, wherein said means for determining priority of each of said client devices comprise means for grouping said plurality of client devices into groups according to I/O performance requirements for said client devices.

19. The system of claim 18, wherein each client device in one of said groups receives a same bandwidth allocation setting as other client devices in that group.

* * * * *